United States Patent
Kwak

(10) Patent No.: US 9,517,585 B2
(45) Date of Patent: Dec. 13, 2016

(54) WASHING MACHINE AND METHOD OF MANUFACTURING THE SAME

(71) Applicant: Dongbu Daewoo Electronics Corporation, Seoul (KR)

(72) Inventor: Heui Seok Kwak, Bucheon-si (KR)

(73) Assignee: Dongbu Daewoo Electronics Corporation, Seoul (KR)

( * ) Notice: Subject to any disclaimer, the term of this patent is extended or adjusted under 35 U.S.C. 154(b) by 28 days.

(21) Appl. No.: 14/542,322

(22) Filed: Nov. 14, 2014

(65) Prior Publication Data

US 2016/0016348 A1 Jan. 21, 2016

(30) Foreign Application Priority Data

Jul. 15, 2014 (KR) .................. 10-2014-0088821

(51) Int. Cl.
| | | |
|---|---|---|
| *B29C 49/20* | (2006.01) | |
| *D06F 37/26* | (2006.01) | |
| *B29L 31/00* | (2006.01) | |

(52) U.S. Cl.
CPC ............ *B29C 49/20* (2013.01); *D06F 37/262* (2013.01); *D06F 37/263* (2013.01); *D06F 37/267* (2013.01); *B29C 2049/2047* (2013.01); *B29L 2031/762* (2013.01)

(58) Field of Classification Search
CPC ...... D06F 37/26; D06F 37/262; D06F 37/263; D06F 37/264; D06F 37/261; D06F 39/12
USPC ....................................................... 312/228
See application file for complete search history.

(56) References Cited

U.S. PATENT DOCUMENTS

| | | | | |
|---|---|---|---|---|
| 2007/0175245 A1* | 8/2007 | Kim | ................ | B29C 45/37 68/140 |
| 2011/0000265 A1* | 1/2011 | Bacelli | ............ | D06F 37/26 68/140 |
| 2011/0146357 A1* | 6/2011 | Arzate Silva | ...... | D06F 37/26 68/212 |
| 2011/0296877 A1* | 12/2011 | Song | ............ | D06F 37/20 68/139 |
| 2011/0296879 A1* | 12/2011 | Seo | ............ | D06F 25/00 68/23 R |
| 2012/0017655 A1* | 1/2012 | Kwon | ............ | D06F 23/06 68/5 C |
| 2014/0230270 A1* | 8/2014 | Lim | ............ | F26B 21/06 34/605 |

FOREIGN PATENT DOCUMENTS

| | | |
|---|---|---|
| EP | 0127360 A2 | 12/1984 |
| EP | 1522624 A2 | 4/2005 |
| JP | H08323095 A | 12/1996 |
| JP | 2003190695 A | 7/2003 |

(Continued)

OTHER PUBLICATIONS

Chung, Seung Hwan, et al.; Tub and a Washing Machine Including the Same, Capable of Preventing Electrical Equipment From Damaged Due to Washing Water by Forcibly Draining the Washing Water Remained in a Tub Inside by Forming an Overflow Part in the Tub; Abstract of KR 10-2010-0038208; Jul. 22, 2010; http://kpa.kipris.or.kr.

*Primary Examiner* — Daniel Rohrhoff

(57) ABSTRACT

A washing machine includes: a cabinet and a tub that is installed in the cabinet and holds washing water. The tub includes a cylindrical housing, and the housing is formed by blow molding.

4 Claims, 7 Drawing Sheets

(56) References Cited

FOREIGN PATENT DOCUMENTS

| KR | 100664071 B1 | 1/2007 |
| KR | 100784404 B1 | 12/2007 |
| KR | 10-2010-0038208 | 7/2010 |
| WO | 2007126167 A1 | 11/2007 |

* cited by examiner

WASHING MACHINE AND METHOD OF MANUFACTURING THE SAME

CROSS-REFERENCE TO RELATED APPLICATION

This application is based on and claims priority to Korean Patent Application No. 10-2014-0088821, filed on Jul. 15, 2014, with the Korean Intellectual Property Office, the disclosure of which is incorporated herein in its entirety by reference.

TECHNICAL FIELD

Embodiments according to the present disclosure relate to a washing machine and a method of manufacturing the same, and more particularly, to a washing machine having a tub that stores washing water and is installed in a cabinet that defines the external appearance of the washing machine, and a method of manufacturing such a washing machine.

BACKGROUND

In general, a washing machine is an apparatus that performs a washing operation and improves washing effectiveness by forcibly forming a flow of washing water in a washing tub using mechanical force, by promoting chemical action of a detergent, and by applying a physical action such as friction or force to laundry.

The washing machine rotates a pulsator, which is installed at the bottom of the washing tub, in forward and reverse directions, thereby forming a water flow for the washing operation. Therefore, the washing machine needs to have a spin-drying shaft for rotating the washing tub, and a washing shaft for driving the pulsator. That is, the washing machine has a clutch for selectively driving the two drive shafts (the washing shaft and the spin-drying shaft). Accordingly, the clutch transmits rotational force generated by a drive motor to the pulsator during washing operations, and selectively transmits rotational force to the pulsator and the washing tub during spin-drying operations.

FIG. 1 is a cross-sectional view illustrating a general washing machine, and FIG. 2 is a perspective view illustrating a tub of FIG. 1. Referring to FIG. 1, a washing machine 10 has a main body (cabinet) 8 that defines its external appearance, and a tub 1 that is in the main body 8.

A washing tub 2, which is rotated by a drive motor 7, is provided in the tub 1, a pulsator 3 for a washing operation is provided at a bottom of the washing tub 2, and the pulsator 3 is rotated by the drive motor 7.

The drive motor 7, which produces rotational force for rotating the washing tub 2 and the pulsator 3, is provided at a lower side of the tub 1. The washing tub 2 receives rotational force from the drive motor 7 through a spin-drying shaft 5, and the pulsator 3 receives rotational force from the drive motor 7 through a washing shaft 6.

The spin-drying shaft 5 and the washing shaft 6 are installed concentrically, and the washing shaft 6 is positioned in the spin-drying shaft 5. The spin-drying shaft 5 and the washing shaft 6 are rotatably supported by a bearing housing 4.

Referring to FIG. 2, the tub 1 has a cylindrical shape, an upper portion of which is open. A hose member 11, which communicates with an overflow path (not illustrated) formed in an inner wall of the tub 1, is provided at one side of an outer surface of the tub 1.

However, the tub of the general washing machine in the related art is manufactured by general injection molding. This is problematic because it takes a long time to manufacture a mold because of the complicated structure of the tub, and consequently the cost of manufacturing the mold and the unit price of the tub are increased.

Also, a process for assembling the hose member and the like, which are provided separately from the tub, to the overflow path after injection molding of the tub is required. This is also problematic because the period of time required to manufacture the tub is further increased, and finishing and trimming work needs to be additionally performed on the coupling portions between the tub, the hose member, and the like.

Korean Patent Application Laid-Open No. 10-2010-0083208 (published on Jul. 22, 2010) describes an example of the related art.

SUMMARY

Embodiments according to the present disclosure provide a washing machine that includes a tub that is formed using blow molding, and a method of manufacturing the same.

A technical problem solved by the present invention is not limited to the aforementioned technical problem, and any other not-mentioned technical problem will be obviously understood from the description below by those skilled in the technical field to which the present disclosure pertains.

An embodiment according to the present disclosure includes a washing machine that includes: a cabinet that defines the external appearance of the washing machine; and a tub that is installed in the cabinet and holds washing water. The tub includes a cylindrical housing, and the housing is formed by blow molding.

In an embodiment, the tub further includes a base which tightly closes a lower end portion of the housing, and the blow molding of the housing is performed after the base is inserted into a mold used for the blow molding.

In an embodiment, the tub further includes a hose member which can be connected to an overflow path formed in an inner wall of the housing, and the blow molding of the housing is performed after the hose member is inserted into the mold used for the blow molding.

In an embodiment, protruding portions and recessed portions, which are spaced apart from each other at predetermined intervals, are formed along a circumference of an upper end portion of the base or the hose member.

In an embodiment, an accommodating portion or an insertion portion may be formed along a circumference of an upper end portion of the base or the hose member.

Another embodiment according to the present disclosure pertains to a method of manufacturing a washing machine that includes a cabinet which defines an external appearance of the washing machine, and a tub which is installed in the cabinet and holds washing water, the method including: forming, by blow molding, a cylindrical housing of the tub, the housing having open upper and lower portions.

In an embodiment, the method further includes: inserting a base into a mold used for the blow molding prior to the blow molding step, in which the base tightly closes a lower end portion of the housing; and forming protruding portions and recessed portions at predetermined intervals along a circumference of an upper end portion of the base.

In an embodiment, the method further includes: inserting a base into a mold used for the blow molding prior to the blow molding step, in which the base tightly closes a lower end portion of the housing; and forming an accommodating portion or an insertion portion along a circumference of an upper end portion of the base.

In an embodiment, a hose member, which can be connected to an overflow path formed in an inner wall of the housing, is inserted into the mold used for the blow molding, and protruding portions and recessed portions are formed at predetermined intervals along a circumference of an upper end portion of the hose member.

In an embodiment, a hose member, which can be connected to an overflow path formed in an inner wall of the housing, is inserted into the mold used for the blow molding, and an accommodating portion or an insertion portion is formed along a circumference of an upper end portion of the hose member.

In embodiments according to the present disclosure, the tub of the washing machine is formed by blow molding such that the mold for manufacturing the tub is simplified, thereby shortening the period of time required to manufacture the mold, and thereby also reducing the cost of manufacturing the mold and the unit price of the tub.

A portion of the tub, which has a structure having a shape that is not suitable for blow molding, is manufactured by general injection molding, and inserted into the mold used for blow molding first, and then the blow molding is performed to form the tub.

A structure for improving fastening force is formed along a circumference of an upper end of the base or the hose member that constitutes a part of the tub, such that a joint portion between the housing and the base or the hose member of the tub is made more waterproof, thereby preventing water from leaking from the tub, and maintaining the strength of the tub.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
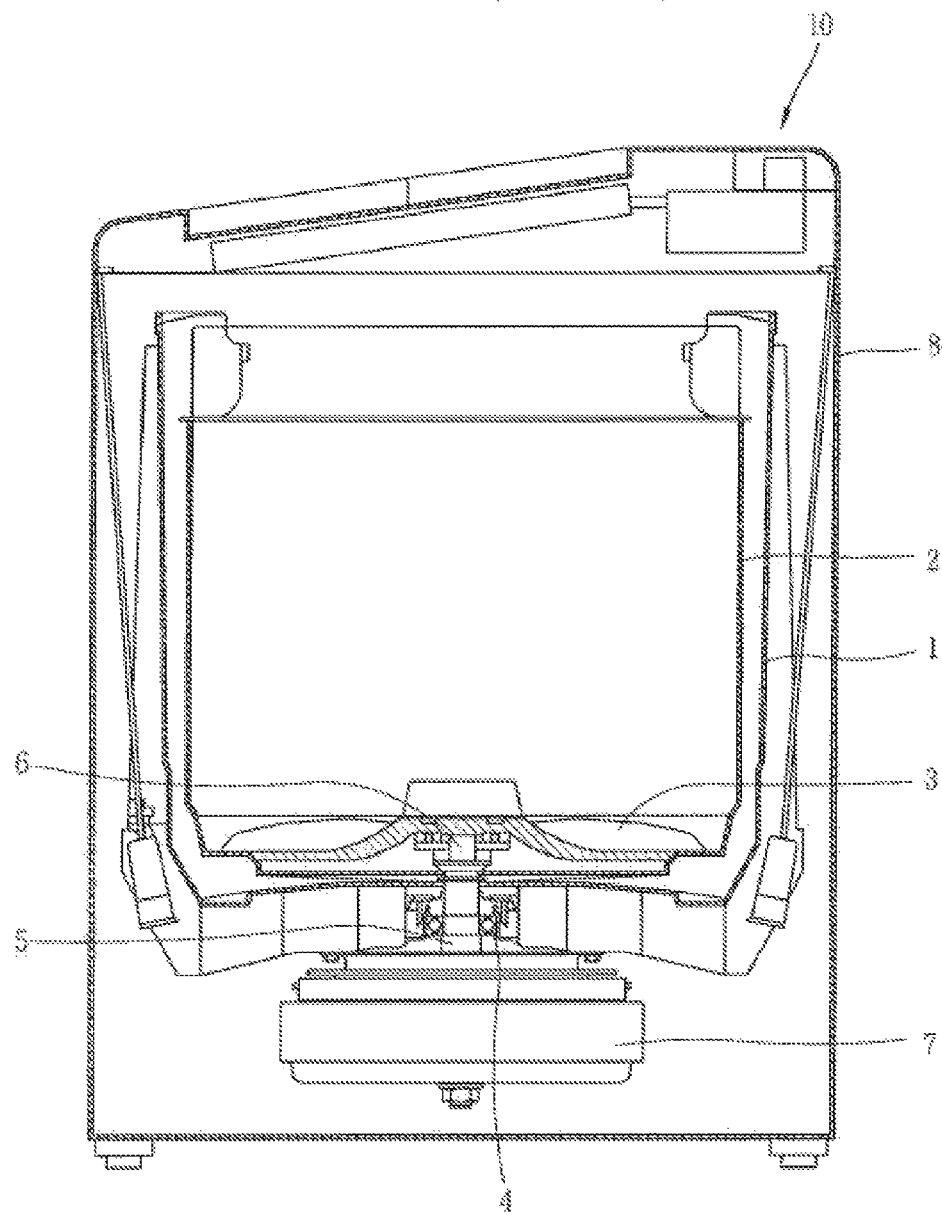
FIG. 1 is a cross-sectional view illustrating a conventional washing machine.
Figure 2:
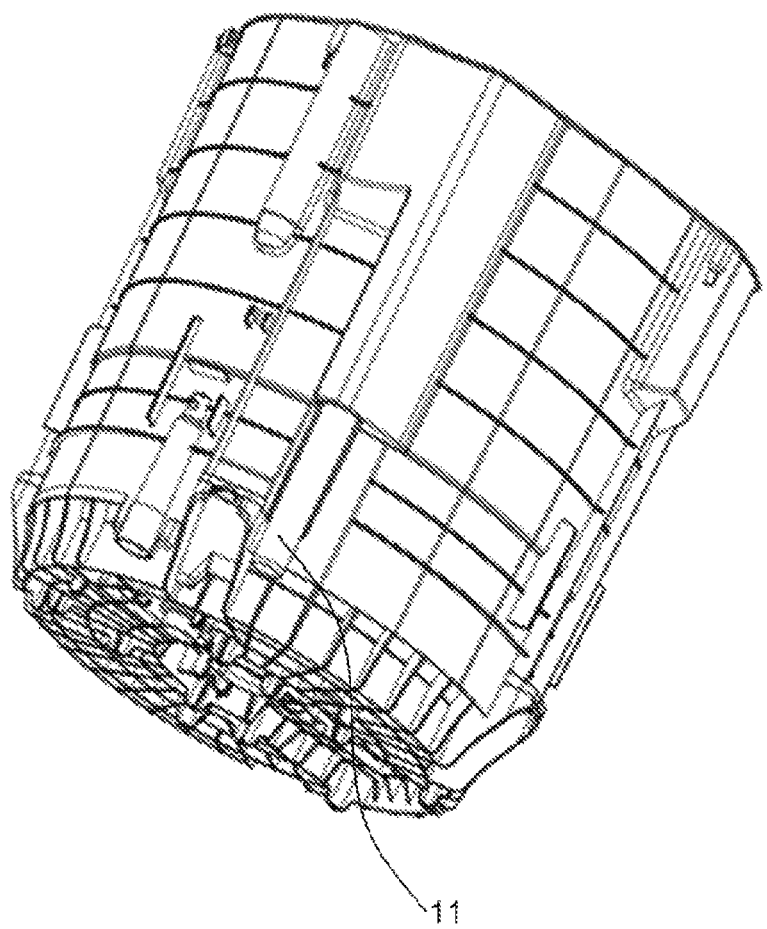
FIG. 2 is a perspective view illustrating a washing machine tub.

Hereinafter, embodiments according to the present disclosure will be described in detail with reference to the accompanying drawings. In this description, sizes or shapes of constituent elements illustrated in the drawings, and the like may be exaggerated for clarity and ease of description. The terms used in the description, which are specially defined in consideration of configurations and operations according to the present disclosure, may vary depending on the intention or usual practice of a user or an operator. The scope and spirit of the present disclosure is not limited to the suggested embodiments. Those skilled in the art who understand the scope and spirit of the present disclosure may easily carry out other embodiments within the scope spirit of the present disclosure, and of course, those embodiments also belong to the scope and spirit of the present disclosure.

Figure 3:
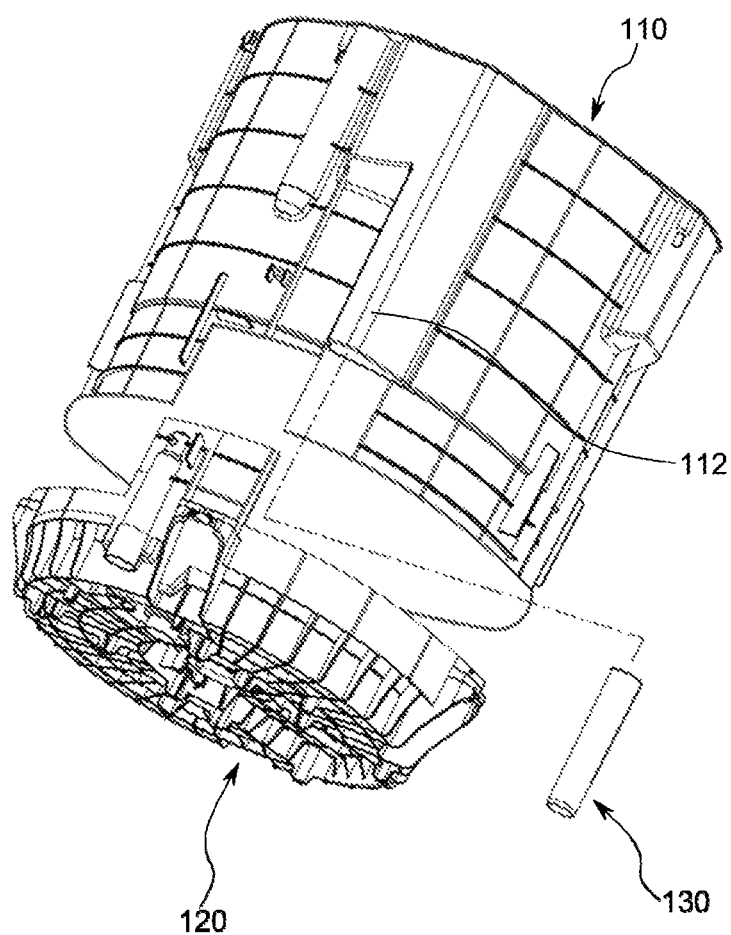
FIG. 3 is an exploded perspective view illustrating a tub for a washing machine in an embodiment according to the present disclosure.
Figure 4:
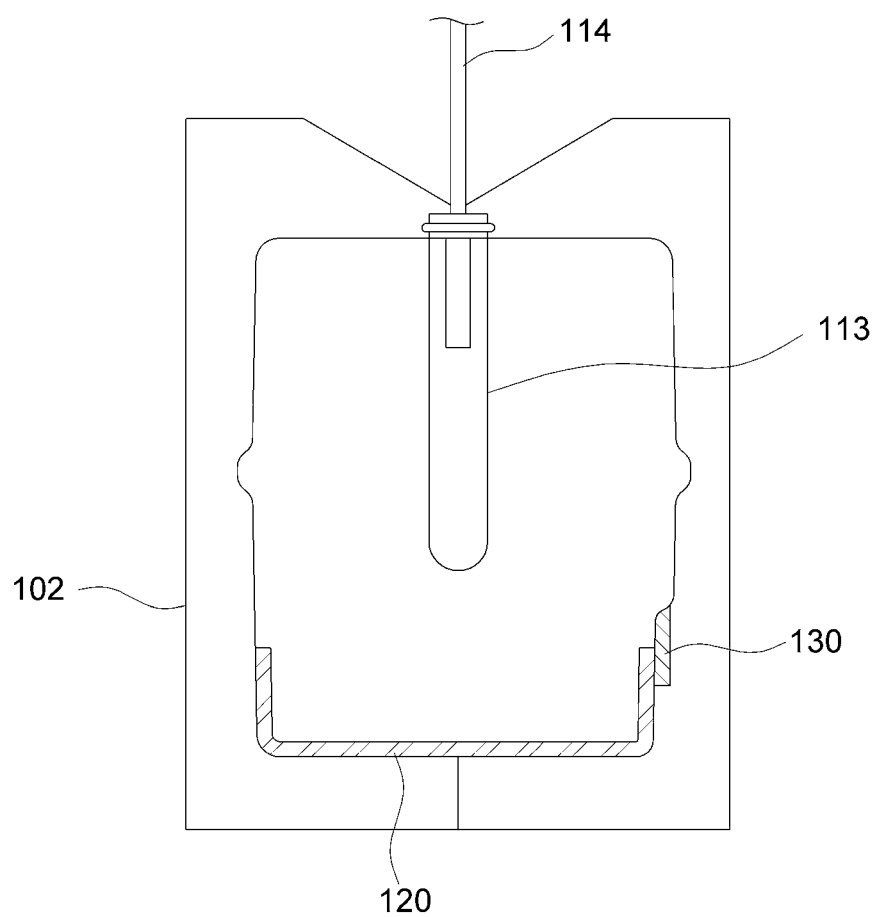
FIGS. 4 and 5 are cross-sectional views illustrating a process of manufacturing the tub for a washing machine in embodiments according to the present disclosure.
Figure 5:
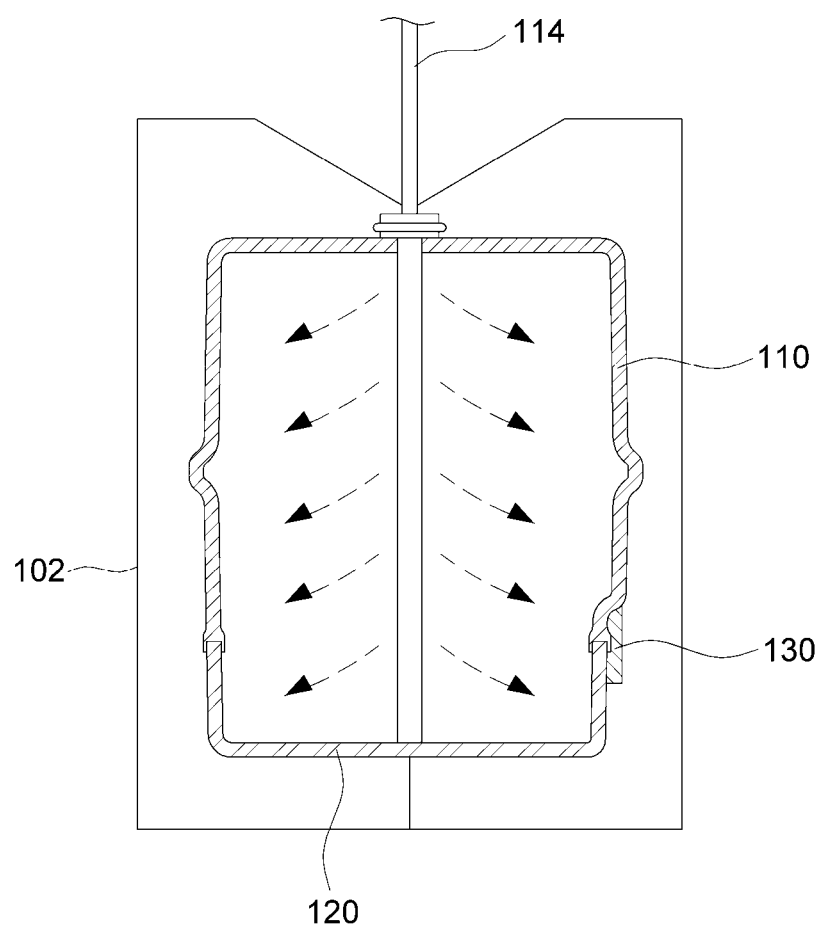

FIG. 3 is an exploded perspective view illustrating a tub for a washing machine in an embodiment according to the present disclosure, and FIGS. 4 and 5 are cross-sectional views illustrating a process of manufacturing the tub in embodiments according to the present disclosure. An example configuration and structure and the like of a tub for a washing machine will be described with reference to FIGS. 3 to 5.

Referring to FIG. 3, a tub 100 is installed in a cabinet, which defines the external appearance of the washing machine. The tub 100 holds washing water. The tub 100 has a cylindrical shape, and includes a housing 110, a base 120, a hose member 130, and other components.

The housing 110 has a tubular or cylindrical shape, and forms a body portion of the tub 100.

Referring to FIGS. 4 and 5, in embodiments according to the present disclosure, the housing 110 is formed by blow molding. Specifically, blow molding is a molding technology for forming a hollow plastic molded product. For example, the housing 110, can be manufactured by heating an intermediate molded product, which is called a preform 113, to an appropriate temperature, and thereafter injecting air into a mold 102 using a stretch rod 114 so that the preform conforms to the walls of the mold and takes the shape of the mold.

When the housing 110 is integrally formed by blow molding as described above, the mold 102 can be formed as a single piece, thereby shortening the period of time required to manufacture the mold 102, and therefore reducing the cost of manufacturing the mold 102 and the unit price of the tub 100.

The base 120 tightly closes a lower end portion of the housing 110, and the hose member 130 is provided on the outer circumferential surface of the housing 110 so that it can be connected to an overflow path 112 formed in an inner wall of the housing 110.

The overflow path serves to forcibly discharge water when the washing water reaches a predetermined level in order to prevent electrical components from being damaged due to an overflow of the washing water that is in the tub 100.

In an embodiment according to the present disclosure, the base 120 and the hose member 130 are inserted into the mold 102 prior to blow molding the housing 110, and the blow molding of the housing 110 is performed in that configuration.

That is, because the base 120 is made of steel, for example, and because it is difficult to form the hose member 130 by blow molding considering the structure of the mold, the tub 100 is manufactured by inserting the base 120 and the hose member 130 into the mold 102 first, and then performing the blow molding of the remaining portions of the housing 110.

Therefore, the portion of the tub 100 that has a structure and/or shape that is difficult to form using blow molding is manufactured by general injection molding and inserted into the mold first, and then blow molding can be performed to form the remainder of the tub 100.

FIGS. 6A, 6B, 7A, and 7B are views illustrating a boundary between the housing and the base or the hose member of tub in an embodiment according to the present disclosure, and a boundary between the housing and the base or the hose member of a tub in another embodiment according to the present disclosure, respectively.

Figure 6A:
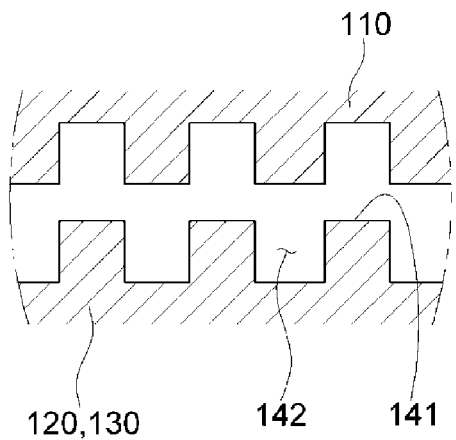
FIG. 6A and FIG. 6B illustrate a boundary between a housing and a base or a hose member of a washing machine tub in an embodiment according to the present disclosure.
Figure 6B:
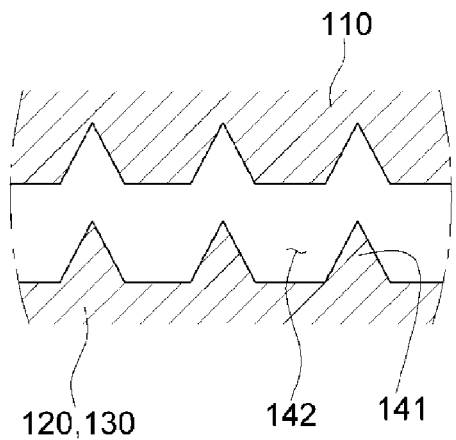

Referring to FIGS. 6A and 6B, protruding portions 141 and recessed portions 142, which are spaced apart from each other at predetermined (e.g., regular or irregular) intervals, are formed along a circumference of an upper end portion of the base 120 or the hose member 130. The protruding portions 141 and recessed portions 142 are complementary to each other.

A structure, which corresponds to the shapes and locations of the protruding portions 141 and the recessed portions 142, is also formed along a circumference of a lower end portion of the housing 110 when the blow molding of the housing 110 is performed.

Therefore, the fastening force between the housing 110 and the base 120 or the hose member 130 is increased, and a joint portion between the housing 110 and the base 120 or the hose member 130 is made more waterproof, thereby preventing water from leaking from the tub 100, and maintaining the strength of the tub 100.

The protruding portions 141 and the recessed portions 142 may be formed in various shapes according to the structure and/or the size of the tub 100, the strength of the joint portion, and other design considerations, and for example, may have a square column shape as illustrated in FIG. 6A, or a shape having a pointed end as illustrated in FIG. 6B.

Figure 7A:
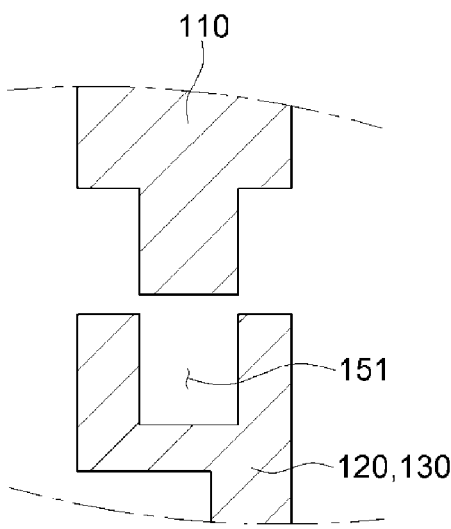
FIG. 7A and FIG. 7B illustrate a boundary between a housing and a base or a hose member of a washing machine tub in another embodiment according to the present disclosure.
Figure 7B:
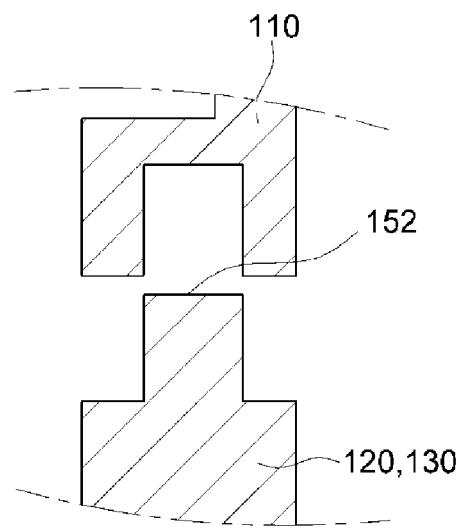

Referring to FIGS. 7A and 7B, an accommodating or receiving portion 151 or an insertion portion 152 is formed along the circumference of the upper end portion of the base 120 or the hose member 130. A complementary structure, which corresponds to the shape of the accommodating portion 151 or the insertion portion 152, is also formed along the circumference of the lower end portion of the housing 110 when the blow molding of the housing 110 is performed.

That is, the insertion portion is formed on the housing 110 in an embodiment in which the accommodating portion 151 is formed in the base 120 or the hose member 130 as illustrated in FIG. 7A, and the accommodating portion is formed in the housing 110 in an embodiment in which the insertion portion 152 is formed on the base 120 or the hose member 130 as illustrated in FIG. 7B. The insertion portion can be inserted into the accommodating portion.

Like the protruding portions 141 and the recessed portions 142, the accommodating portion 151 and the insertion portion 152 also increase the fastening force between the housing 110 and the base 120 or the hose member 130, and also make a joint portion between the housing 110 and the base 120 or the hose member 130 more waterproof, thereby preventing water from leaking from the tub 100, and maintaining the strength of the tub 100.

The accommodating portion 151 and the insertion portion 152 may be formed in a square column shape when viewed in cross-section, but may be formed in various shapes according to the structure and/or the size of the tub 100 and the strength of the joint portion.

Figure 8:
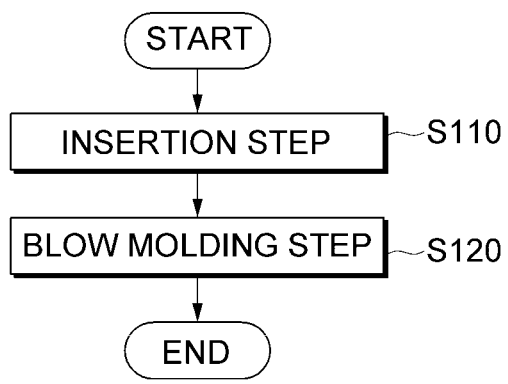
FIG. 8 is a flowchart illustrating a method of manufacturing a washing machine tub in an embodiment according to the present disclosure.

FIG. 8 is a flowchart illustrating a method of manufacturing a tub for a washing machine in an embodiment according to the present disclosure. The method of manufacturing the tub will be described in detail with reference to FIG. 8.

The method of manufacturing the tub includes integrally forming the housing 110, the base 120, the hose member 130, and other components using blow molding and injection molding, and includes an insertion step S110 and a blow molding step S120, and may include other steps.

In the insertion step S110, the base 120 and the hose member 130 are inserted into the mold 102 that is used for blow molding, before the housing 110 is formed using blow molding.

That is, as described above, because the base 120 is made of steel, for example, and because it is difficult to form the hose member 130 by blow molding considering the structure of the mold 102 used for blow molding, the base 120 and the hose member 130 are difficult to manufacture by blow molding.

Therefore, the housing 110 is manufactured by inserting the base 120 and the hose member 130 into the mold 102 first (before the blow molding step) in the insertion step S110, and then performing the blow molding of the remaining portion.

In the blow molding step S120, the housing 110 is formed by blow molding in a configuration in which the base 120 and the hose member 130 are previously inserted into the mold 102 in the insertion step S110 as just described.

In an embodiment, the protruding portions 141 and the recessed portions 142, which are spaced apart from each other at predetermined (e.g., regular or irregular) intervals, are formed along the circumference of the upper end portion of the base 120 and the hose member 130, or, in another embodiment, the accommodating portion 151 and the insertion portion 152 are formed. Therefore, the fastening force between the housing 110 and the base 120 or the hose member 130 may be increased, and a joint portion between the housing 110 and the base 120 or the hose member 130 is made more waterproof, thereby preventing water from leaking from the tub 100, and maintaining the strength of the tub 100.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A washing machine comprising:
a cabinet; and
a tub that is installed in the cabinet and configured to hold washing water,
wherein the tub includes a cylindrical housing, and the housing is formed by blow molding; and
wherein the tub further includes a hose member that is connected to an overflow path formed in an inner wall of the housing, and wherein the blow molding of the housing is performed after the hose member is inserted into a mold used for the blow molding.

2. The washing machine of claim 1, wherein the tub further includes a base that closes a lower end portion of the housing, and wherein the blow molding of the housing is performed after the base is inserted into the mold used for the blow molding.

3. The washing machine of claim 1, wherein protruding portions and recessed portions complementary to the protruding portions are formed at predetermined intervals along a circumference of the base and the hose member.

4. The washing machine of claim 1, wherein an insertion portion and an accommodating portion into which the insertion portion is inserted are formed along a circumference of the base and the hose member.

\* \* \* \* \*